HIGH POWER SINE WAVE GENERATOR

Filed June 28, 1963

WITNESSES:

Bernard R. Gregory

William L. Gates

INVENTORS
Wayne R. Olson and
Edward H. Hooper.

BY Ernest P. Klipfel
ATTORNEY

United States Patent Office 3,316,476
Patented Apr. 25, 1967

3,316,476

HIGH POWER SINE WAVE GENERATOR

Wayne R. Olson and Edward H. Hooper, Baltimore, Md., assignors to Westinghouse Electric Corporation, Pittsburgh, Pa., a corporation of Pennsylvania Filed June 28, 1963, Ser. No. 291,559
6 Claims. (Cl. 321—45)

This invention relates to apparatus for generating an electrical carrier wave signal for communications apparatus and more particularly to a relatively high power sine wave generator for a solid state transmitter operating in the very low frequency (VLF) range of the electromagnetic spectrum, and for apparatus operating in the ultrasonic region of the spectrum.

This invention is an improvement over the solid state high power sine wave generator disclosed in Patent No. 3,243,729 issued Mar. 29, 1966, to Wayne R. Olson et al. and assigned to the assignee of the present invention. Whereas the aforementioned invention discloses electrical apparatus for generating relatively high sine wave power utilizing solid state devices such as silicon controlled rectifiers acting as switches to control the resonant charging and discharging of a plurality of capacitors which are sequentially discharged into a resonant load, it permits the transfer of energy to the resonant load only during the discharge time interval of each capacitor. That is electrical energy is first accumulated in the capacitors and then discharged or dumped into the load. It has been found desirable to be able to transfer energy from a plurality of substantially identical stages or sections to the load during both half cycles of operation of each stage.

It is an object of the present invention therefore to provide an improved solid state high power sine wave generator.

It is another object of the present invention to provide an improved solid state high power sine wave generator having a plurality of stages which allows energy to be transferred to the load during both charging and discharging intervals of each stage.

It is still a further object of the present invention to provide an improved RF generator for a solid state transmitter utilizing a plurality of energy storage sections which sequentially deliver an incremental amount of electrical energy to a resonant load in "Gatling gun" fashion.

It is yet another object of the present invention to provide an improved RF generator for a solid state transmitter transmitting ultrasonic and VLF frequency signals.

Briefly, the subject invention accomplishes the above-cited objects by providing a resonant load circuit in series circuit combination with an energy storage device such as a capacitor and resonantly altering the electrical charge on the capacitor by passing an electrical current through the series circuit combination such that energy is transferred to the load during each alternation to initiate and sustain oscillations. A pair of silicon controlled rectifiers and a pair of inductors are utilized to change the state of the capacitor through resonant action during a first period of operation and then return it to an original state through resonant action during a second period of operation. For high power applications, a plurality of stages are utilized and the capacitor associated with each stage has its charge predeterminedly reversed in a selected order so that each stage provides an incremental amount of energy to the load in order to generate a relatively high powered carrier signal but wherein each stage only delivers a portion of the total output power generated.

Other objects and advantages will become apparent as the following specification is read in conjunction with the accompanying drawings, in which.

Figure 1:
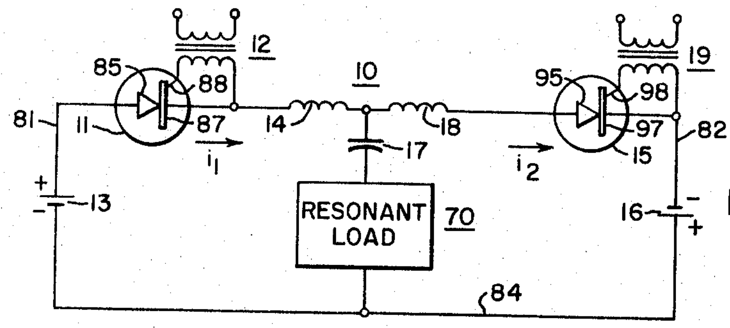
FIGURE 1 is a schematic diagram of a circuit embodying the subject invention.

Attention is now directed to FIG. 1 which illustrates the basic concept of the subject invention. Shown therein is a resonant load 70 which is adapted to receive energy from the D.C. potential sources 13 and 16. Connected in series with the resonant load 70 is a capacitor 17 which is adapted to have its charge altered or reversed by the batteries 13 and 16. In greater detail, the positive terminal of D.C. source 13 is connected to the anode electrode 85 of the silicon controlled rectifier 11. The cathode electrode 87 of silicon controlled rectifier 11 is connected to one end of an inductor 14 which has its other end connected to one side of the capacitor 17. The other side of capacitor 17 is connected to one end of the load 70 the opposite end of which is connected to the negative terminal of the D.C. battery 13 by means of suitable circuit means 84. The gate electrode 88 of silicon controlled rectifier 11 is connected to the secondary winding of transformer 12 whose primary winding is adapted to be connected to a driver, not shown, which supplies a trigger or activating signal for rendering silicon controlled rectifier 11 selectively conductive.

Connected to the negative terminal of D.C. battery 16 is the cathode electrode 97 of a second silicon controlled rectifier 15. The anode electrode 95 of silicon controlled rectifier 15 is connected to one end of a second inductor 18 whose other end in turn is connected to the side of capacitor 17 which is connected in common to one end of inductor 14. The positive terminal of the D.C. battery 16 is returned to the side of the load 70 which is tied to the negative terminal of D.C. battery 13 by circuit means 84. The gate electrode 98 of silicon controlled rectifier 15 is connected to the secondary winding of the transformer 19 whose primary winding is also connected to a driver source, not shown, which likewise delivers a trigger or actuating signal to the gate electrode 98 for rendering silicon controlled rectifier 15 selectively conductive in the same manner as silicon controlled rectifier 11. However, it should be pointed out that the actuating signals are delivered in a time sequence which allows silicon control rectifier 11 to conduct during a first period while silicon controlled rectifier 15 is kept non-conductive; however during a second period of operation silicon controlled rectifier 15 is rendered conductive while silicon controlled rectifier 11 remains non-conductive.

In operation silicon controlled rectifier 11 is rendered conductive during said first period of operation wherein capacitor 17 accumulates a charge of a predetermined voltage from the D.C. battery 13 through the silicon controlled rectifier 11, the inductor 14, and the load 70. The combination of the inductor 14 and the capacitor 17 form a series resonant circuit which is chosen to be resonant at the output frequency $f_0$ of the load 70. The resonant charging of the capacitor 17 during the first period of operation charges the capacitor to a value approximately twice the D.C. battery potential of D.C. battery 13 whereupon the silicon controlled rectifier 11 becomes non-conductive as the current passing therethrough attempts to reverse due to the voltage on the capacitor becoming greater than the D.C. battery voltage. It should be pointed out that the battery 13, the silicon controlled rectifier 11, the inductor 14, the capacitor 17 and the load 70 form a series circuit such that the charge built up on the capacitor 17 passes through the load 70 delivering energy thereto from the battery 13.

After the voltage on the capacitor 17 has built up to substantially twice the battery voltage and silicon controlled rectifier 11 becomes non-conductive, silicon controlled rectifier 15 is rendered conductive at a predetermined later time by means of an activating signal applied to the gate electrode 98 whereupon capacitor 17 reverses its charge through the series combination of the inductor 18, silicon controlled rectifier 15, the battery 16 and the load 70. By this change of state of capacitor 17, energy is again transferred to the load 70 from the power source, the D.C. battery 16. Although the magnitude of voltage is substantially the same as before, the polarity of the voltage across the capacitor has reversed. Again, when the current flow through silicon controlled rectifier 15 starts to reverse it becomes non-conductive and at a later time silicon controlled rectifier 11 is then rendered conductive allowing capacitor 17 again to change its charge state back to twice the voltage of D.C. battery 13 and in the original polarity. What occurs in a sense is a charging, discharging and recharging of the capacitor 17 between two D.C. potential sources through a resonant load 70 which is in series with the capacitor 17. This change of state of the capacitor 17 effects energy transfer to the load 70 during both periods of operation rather than employing the first period to first place a charge on the capacitor and then in the second period of operation dumping the charge accumulated thereon into the load as described in the aforementioned Patent No. 3,243,729.

Also it should be pointed out that the combination of capacitor 17 and the second inductor 18 forms a second series resonant circuit which is also designed to have a resonant frequency substantially equal to the output frequency $f_0$ of the resonant load 70.

The load 70 comprises a low impedance parallel resonant circuit, commonly called a tank circuit. Transformer coupling may be employed when desirable between the load 70 and the capacitor 17 for impedance matching. However, the resonant frequency of the tank circuit is made to be the operating frequency of the circuit so that an output frequency $f_0$ is provided. The loaded Q of the tank circuit or resonant load 70 for VLF applications should be for example in the general range of from 5 to 50.

Figure 2:
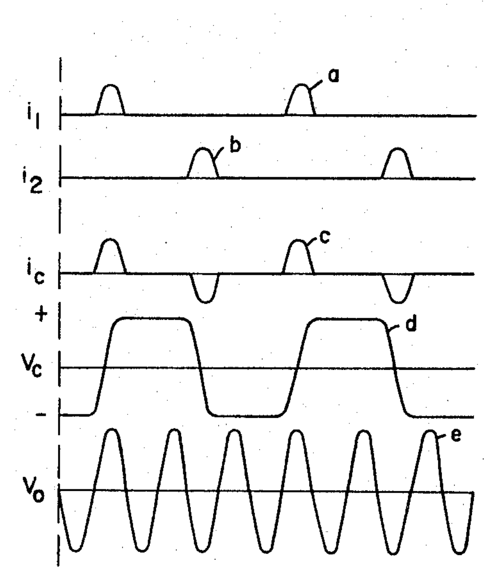
FIG. 2 is a diagram illustrating the various waveforms helpful in illustrating the operation of the circuit shown in FIG. 1.

FIG. 2 is a group of waveforms illustrating the operation of the circuit of FIG. 1. Curve *a* of FIG. 2 is the waveform depicting the current flow $i_1$ which charges capacitor 17 from the D.C. battery 13 in FIG. 1. The positive polarity indicates current flowing in clockwise direction around the loop. Curve *b* is a waveform of the current $i_2$ which flows to charge the capacitor 17 from the D.C. battery 16. The currents $i_1$ and $i_2$ flow when silicon controlled rectifiers 11 and 15, respectively, are rendered conductive. It should be observed that the composite current $i_c$ through the capacitor 17 as illustrated in curve *c* of FIG. 2 shows that current flows first in one direction and then the other at evenly spaced time intervals. Curve *d* is a waveform illustrative of the voltage waveform $V_c$ of the charge accumulated across the capacitor. It will be observed that the capacitor voltage moves above and below the base line by an equal amount signifying that the capacitor voltage is reversing polarity first in one direction to twice the D.C. supply voltage from battery 13 and then in the opposite direction to twice the D.C. battery voltage as supplied by battery 16. Curve *e* is a waveform of the output voltage appearing across the tank circuit comprising the resonant load 70. The waveform is a sine wave having a fixed frequency which is the frequency $f_0$ and is the resonant frequency of the tank circuit 70. It will be observed that the curves *a* and *b* representing the currents $i_1$ and $i_2$, respectively, do not flow at a frequency equal to the output frequency $f_0$ corresponding to curve *e* but on the other hand these currents flow at ⅓ the output frequency $f_0$ and alternately with respect to one another. This means that actuating signals for the respective silicon controlled rectifiers are applied to the silicon controlled rectifiers 11 and 15 at ⅓ the output frequency $f_0$. Each action delivers power to the resonant load 70 as the current flows through the load as a pulse which closely resembles a ½ sine wave. All frequencies except $f_0$ are attenuated by the tank circuit.

Figure 3:
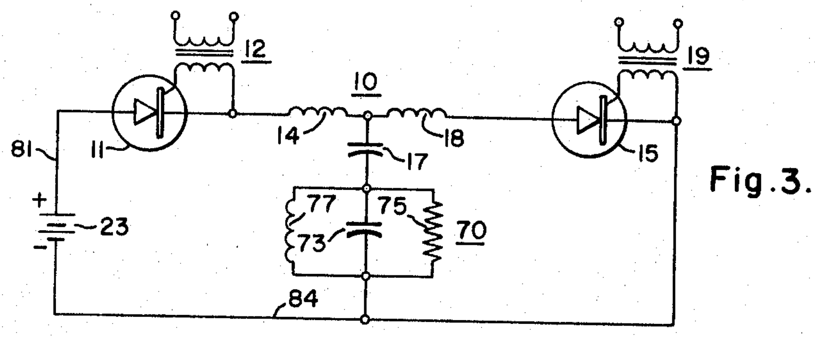
FIG. 3 is a schematic diagram of another embodiment of the present invention.

Rather than utilizing two D.C. sources such as illustrated in FIG. 1, the inventive concept of delivering power to a resonant load to sustain oscillations during both periods of operation can be accomplished with only one D.C. supply source 23 by utilizing the embodiment shown by the circuit illustrated in FIG. 3. This circuit is very similar to the one illustrated in FIG. 1 but the D.C. battery 16 of FIG. 1 has been removed and only the D.C. battery 23 is utilized. The battery 23 is connected to silicon controlled rectifier 11 which is in turn connected in series to the inductor 14, the capacitor 17 and a resonant load 70. Resonant load 70 in turn comprises an inductance 77, a capacitor 73 and a resistance 75 which is illustrated. The resonant load 70 is a parallel tank circuit and is for example an equivalent circuit of the antenna circuitry associated with the output network of a radio transmitter. It is an equivalent circuit of an antenna circuit which may readily be utilized in a solid state transmitter for VLF communications, sonar or other ultrasonic apparatus. Also included with this embodiment is a second inductor 18 and a second silicon controlled rectifier 15 in combination with the capacitor 17 and the load 70 forming a second series circuit which will provide a discharge path for the capacitor 17, whereas the first series circuit includes the battery 23, the silicon controlled rectifier 11 and the adapter 14 and provides a charge path for the capacitor 17 through the resonant load 70.

The operation of the circuit illustrated in FIG. 3 is similar to the operation of the circuit shown in FIG. 1 except that the capacitor 17 is merely charged by means of the battery 23 and then discharged without a recharging to another battery potential as occurs in the circuit disclosed in FIG. 1. More particularly, the operation of the circuit in FIG. 3 is such that when a trigger signal is applied to the gate electrode 88 of silicon controlled rectifier 11 from a driver source, not shown, rendering it conductive, the capacitor 17 is charged through the load 70 and the inductor 14 to approximately twice the D.C. supply voltage of the D.C. battery 23 due to the resonant condition of the series resonant combination of capacitor 17 and inductor 14. The series resonant frequency is made substantially equal to the resonant frequency $f_0$ of the resonant load 70 to provide a maximum operating condition wherein greatest efficiency occurs. Again, as the capacitor 17 is charged to twice the battery voltage, the current in the silicon controlled rectifier 11 attempts to reverse at which time it becomes non-conductive completing the first period or one-half cycle of operation. At a predetermined later time silicon controlled rectifier 15 is then rendered conductive by a signal applied to the gate electrode 98 from a driver source, not shown, through the transformer 19 allowing the capacitor 17 to discharge through the discharge path. Due to the flywheel effect of the capacitor-inductor combination, the capacitor then charges slightly in the opposite direction. When a current reversal starts to take place through the silicon controlled rectifier 15, it becomes non-conductive and the capacitor is again ready to be charged again from the battery 23 when a trigger voltage is applied to silicon controlled rectifier 11. It can be seen therefore that the action of the circuit shown in FIG. 3 provides an energy transfer to the load 70 during both periods of operation whereby capacitor 17 is first charged and then discharged, but only one D.C. power source need be used.

Figure 4:
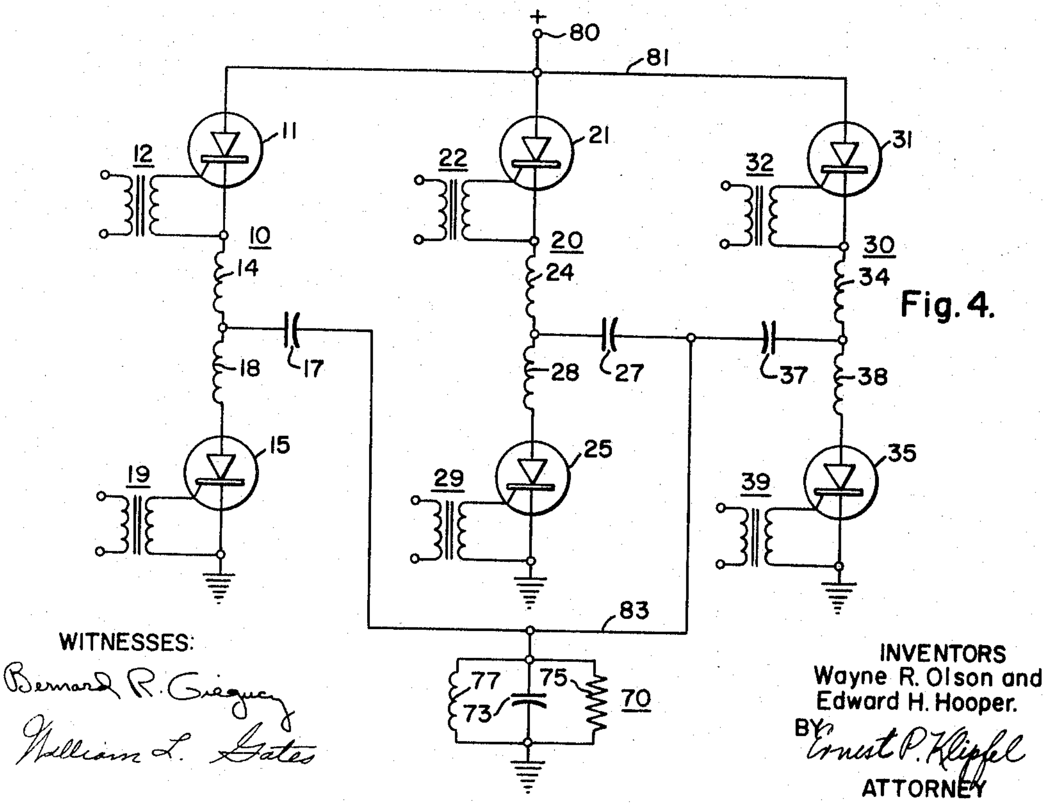
FIG. 4 is a schematic diagram of a three stage configuration employing the embodiment shown in FIG. 3.

FIG. 4 is illustrative of a preferred embodiment of the subject invention wherein a plurality of sections embodying the circuits shown in FIG. 3 is utilized to deliver incremental amounts of electrical energy to a resonant load 70. The broad concept of operating a plurality of these circuits in sequence into a resonant load is taught in Patent No. 3,243,728 issued Mar. 29, 1966, to G. R. Brainerd et al. and assigned to the assignee of the present invention. This copending application describes the "Gatling gun" approach to the generation of high power sine waves wherein energy storage devices are sequentially loaded and unloaded into a resonant load. The subject invention comprises a particular circuit to be utilized with the "Gatling gun" concept.

The embodiment of FIG. 4 comprises three circuit stages or sections 10, 20 and 30 connected in parallel between a D.C. potential source, not shown, which is connected at terminal 80 and a resonant load 70 comprising a parallel tank circuit, which may be for example the output circuit of a radio transmitter sonar or other similar communications apparatus. Each stage or section comprises a pair of silicon controlled rectifiers, for example silicon controlled rectifier 11 and silicon controlled rectifier 15 of stage 10 in circuit combination with the capacitor 17 and associated inductances 14 and 18. Sections 10, 20 and 30 are connected in parallel to the terminal 80 through means of a bus line 81 and to one side of the resonant load 70 by means of the bus line 83. Although the three stages are connected in parallel, each capacitor 17, 27 and 37 is respectively connected in series with the load 70. The opposite end of the load 70 is returned to a point of common reference potential illustrated as ground and one silicon controlled rectifier of each stage 15, 25 and 35 has its cathode electrode returned to ground for reasons which will become obvious as the following description proceeds. The action of each stage is the same as that for the circuit of FIG. 3 in that during one time interval the capacitor is charged through the load 70 to a predetermined voltage from the supply source, not shown, and then discharged through the silicon controlled rectifier which has its cathode electrode returned to ground. Whereas a single stage charges the capacitor and at a predetermined time later discharges, the use of three or more stages such as illustrated in FIG. 4 requires that the control or actuating signals for the silicon controlled rectifiers, acting as switches, interlaced or timed to deliver incremental amounts of energy are delivered to the load from each capacitor of the plurality of stages in a predetermined sequence to sustain oscillations in the resonant load 70. It has been observed that optimum operation occurs when an odd number of sections are utilized to provide a transfer of energy to the resonant load on every half cycle of the output voltage across the tank circuit.

Figure 5:
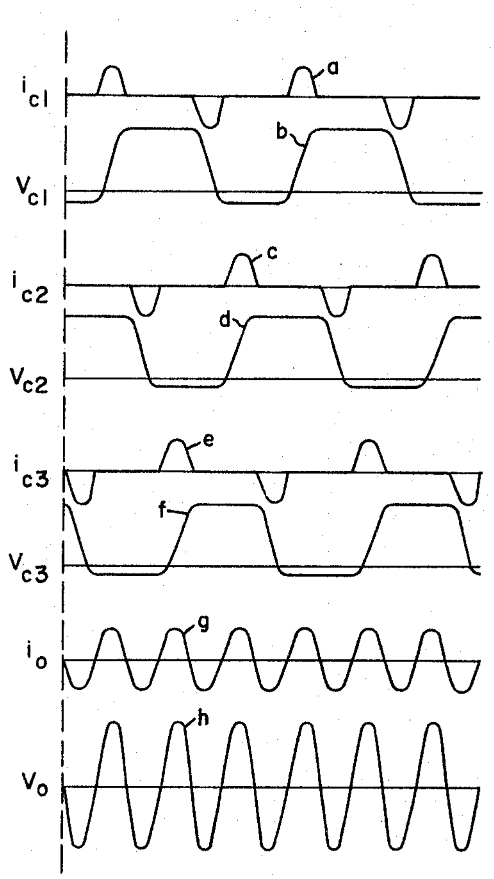
FIG. 5 is a diagram helpful in illustrating the operation of the circuit shown in FIG. 4.

Reference to FIG. 5 will illustrate the operation of the embodiment shown in FIG. 4. FIG. 5 is an illustration of waveforms which are produced by the combined actions of the three stages 10, 20 and 30. Curves *a*, *c* and *e* are illustrative of the current flow $i_{c1}$, $i_{c2}$ and $i_{c3}$ through each of the capacitors 17, 27 and 37 respectively whereas curves *b*, *d* and *f* are illustrative of the voltages $V_{c1}$, $V_{c2}$ and $V_{c3}$ occurring thereacross. The composite curve *g* is composed of three spaced currents $i_{c1}$, $i_{c2}$ and $i_{c3}$ properly synchronized to provide a continuous sine wave of current $i_0$ through the load 70. Since the current is continuously flowing through the load 70, the tank circuit comprising inductance 77, the capacitor 73, the load resistance 75 sustains oscillation according to curve *h* at a frequency $f_0$ which is the resonant frequency of the tank and which is the predetermined frequency at which the circuit is chosen to operate to provide an output signal.

Figure 6:
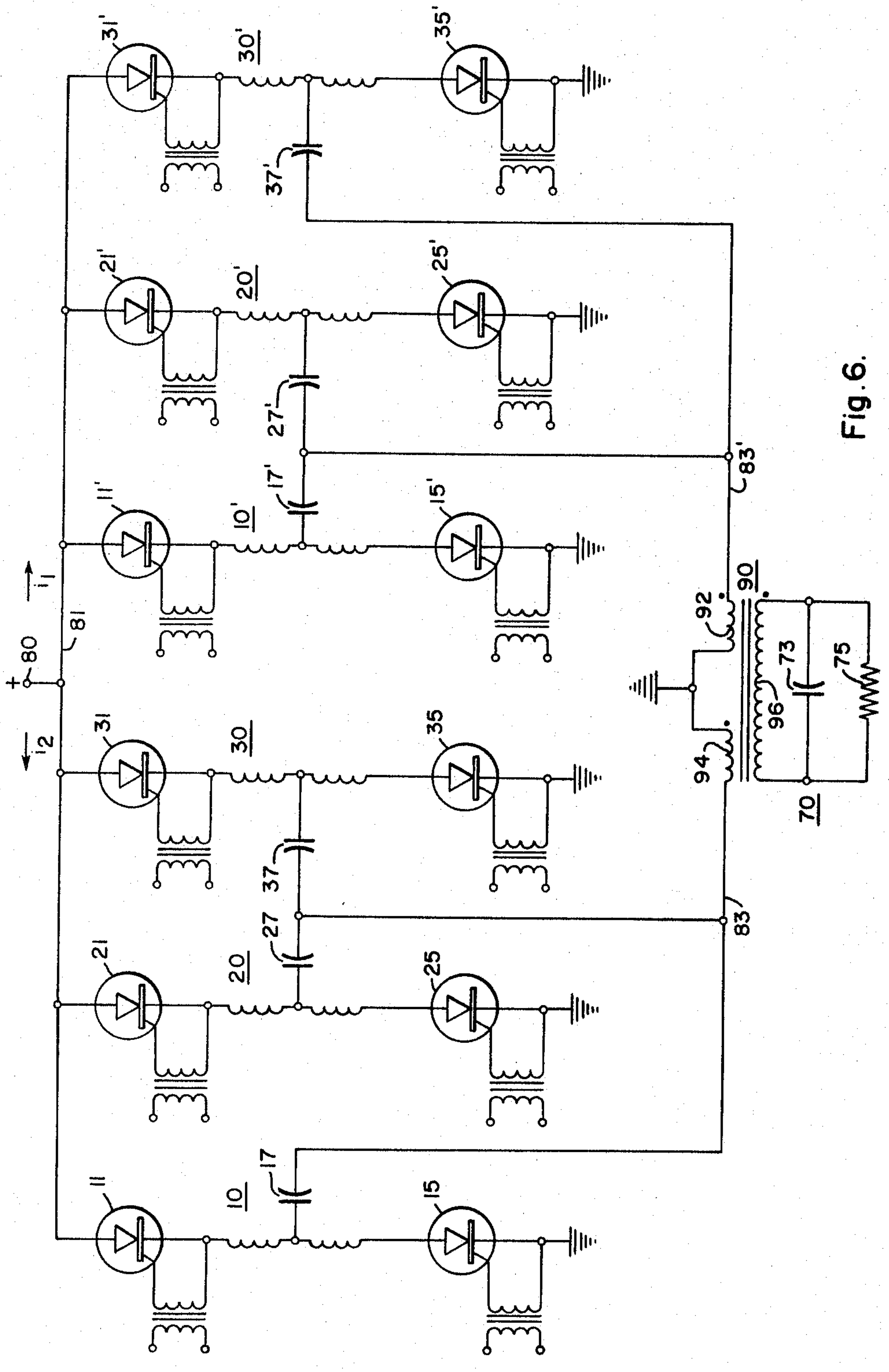
FIG. 6 is a schematic diagram of a modification of the circuit shown in FIG. 4 which allows full wave loading of the power source.

In order that full wave loading might be placed on the power supply as opposed to the half-wave loading which characterizes the circuit of FIG. 4, a configuration as illustrated in FIG. 6 may be utilized. Whereas the embodiment shown in FIG. 4 draws current from the power source only 50% of the time, the present embodiment draws current nearly 100% of the time. The embodiment shown therein comprises six stages or sections of the type described with regard to the embodiment shown in FIG. 3 but is a duplication of the circuitry illustrated in FIG. 4 with the addition of an output transformer 90. Illustrated in FIG. 6 are sections 10, 20, 30 and its complementary stage 10', 20' and 30' respectively. The action of the stages is identical to the embodiment shown in FIG. 4 but the operational sequence is changed such that two stages say for example 10 and 10' operate alternately to deliver current into the load 70. Similarly, stages 20 and 20' and 30 and 30' operate to more effectively balance the current drawn from the D.C. supply source, not shown, applied to terminal 80, whereas in the prior embodiment each capacitor is directly connected to the resonant load 70. In the present embodiment the capacitors 17, 27 and 37 are connected to the winding 94 of output transformer 90 and capacitors 17' and 27' and 37' are connected to the winding 92. The opposite ends of windings 94 and 92 are respectively connected to ground and the secondary winding 96 of transformer 90 forms part of the resonant tank circuit 70.

The embodiments shown herein provide a basic advantage over the aforementioned related patents in that better utilization of the capabilities of silicon controlled rectifiers is effected. For example, the maximum sine wave output power capabilities for a given silicon controlled rectifier volt-ampere rating utilizing the teachings of the present invention is twice that of Patent No. 3,243,729. It will be obvious then that fewer silicon controlled rectifiers are needed for a given power level and will result in lower cost, smaller and lighter weight apparatus.

While there have been shown and described what are at present considered to be the preferred embodiments of the invention, modifications thereto will readily occur to those skilled in the art. It is not desired therefore that the invention be limited to the specific arrangements shown and described, but it should be understood that the present disclosure has been made only by way of example and that numerous changes may be resorted to without departing from the spirit and scope of the present invention.

We claim as our invention:

1. A high power sine wave generator adapted to be connected to at least one source of electrical potential, comprising in combination: a resonant load having a predetermined output frequency; a first circuit including a semiconductor switch device adapted to be rendered selectively conductive, an inductance, and a capacitance connected in series circuit combination between said load and said source of electrical potential, said inductance and said capacitance forming a series resonant circuit having a predetermined frequency of resonance substantially the same as said output frequency, said capacitance further adapted to have a first charge state by current flowing through said load when said semiconductor switch is rendered conductive; and a second circuit including another semi-conductor switch adapted to be rendered selectively conductive when said semiconductor switch of said first circuit is non-conducting, another inductance and said capacitance of said first circuit coupled together in another series circuit combination across said load, said another inductance and said capacitance also forming another series resonant circuit having a frequency of resonance substantially the same as said output frequency, said capacitance adapted to have an opposite charge state by current flowing through said load when said another semiconductor switch is rendered conductive, whereby electrical energy is transferred to said resonant load during both states of said capacitance.

2. A high power sine wave generator for radio apparatus and adapted to be connected to a source of electrical potential comprising, in combination: a resonant tank circuit having a predetermined output frequency; a first circuit means including a first semiconductor switch device adapted to be rendered selectively conductive, a first inductance and a capacitance connected in series circuit combination between said tank circuit and said source of electrical potential, said first inductance and said capacitance also forming a first series resonant circuit having a frequency of resonance substantially the same as said output frequency, said capacitance further being charged to a predetermined voltage from said source through said load when said first semiconductor switch is rendered conductive; and second circuit means including a second semiconductor switch adapted to be rendered selectively conductive when said first semiconductor switch of said charge circuit is non-conducting, a second inductance and said capacitance of said charge circuit coupled in another series circuit combination across said tank circuit, said second inductance and said capacitance also forming a second series resonant circuit having a frequency of resonance substantially the same as said output frequency, said capacitance being discharged to a predetermined voltage through said tank circuit when said second semiconductor switch is rendered conductive, whereby electrical energy is transferred to said tank circuit to sustain oscillations during charging and discharging of said capacitor.

3. A solid state high power sine wave generator comprising, in combination: a first and a second source of electrical potential; a capacitor adapted to have its electrical charge reversed between said first and second source of electrical potential; a resonant load circuit coupled in series circuit relatonship with said capacitor; first electrical circuit means coupling said first source of electrical potential to said capacitor at predetermined intervals for resonantly charging said capacitor to a predetermined voltage in one direction through said load; and electrical circuit means alternately connecting said second source of electrical potential at predetermined intervals to said capacitor for resonantly charging said capacitor in an opposite direction through said load.

4. An RF power generator for a solid state transmitter of electromagnetic energy comprising, in combination: at least one source of D.C. current; a resonant load adapted to sustain oscillations at a predetermined resonant frequency; a plurality of electrical energy storage devices, each being connected in series circuit relationship to said resonant load, and each of said devices including semiconductor switch means for resonantly charging said devices to a predetermined voltage from said D.C. current source and each of said devices including means for discharging the energy stored therein through said resonant load at selected time intervals.

5. In apparatus for transmitting VLF and ultransonic frequencies utilizing solid state devices the combination of, a resonant load having a predetermined output frequency; at least one D.C. voltage source; a plurality of electrical energy storage circuits, said electrical energy storage circuits comprising a first current path including a first silicon controlled rectifier adapted to be rendered selectively conductive, a first inductance, and a capacitance connected in series circuit combination between said at least one of D.C. voltage source and connected in series circuit combination between said source and said resonant load, said inductance and said capacitance having selected values to be resonant at a frequency substantially the same as said output frequency, said capacitance being resonantly charged from said source through said load when said first silicon controlled rectifier is rendered conductive; and a second current path including a second silicon controlled rectifier adapted to be rendered selectively conductive when said first silicon controlled rectifier of said charge circuit is non-conducting, a second inductance, and said capacitance of said charge circuit interconnected in a second series circuit combination across said load circuit, said second inductance and said capacitance also having selected values to provide a resonant frequency substantially the same as output frequency, said capacitance being resonantly discharged through said load circuit when said second silicon controlled rectifier is rendered conductive, whereby electrical energy is transferred from each of said plurality of energy storage sections to said resonant load during respective charging and discharging intervals of each of said capacitors to sustain oscillations in said resonant tank circuit to provide an output voltage of relatively high power.

6. In a solid state transmitter utilizing a plurality of substantially identical energy storage sections selectively operated in a sequential manner to deliver energy to a resonant load for generating a carrier signal of relatively high power comprising, in combination: a D.C. supply; a plurality of energy storage circuits adapted to transfer electrical energy sequentially into said resonant load, said plurality of circuits each comprising a first and a second silicon controlled rectifier, a first and a second inductance, and a capacitor, said first silicon controlled rectifier, said first inductance and said capacitance interconnected to form a series circuit combination coupled to one side of said resonant load circuit for transferring energy from said D.C. supply during a first period of operation wherein a charge is accumulated on said capacitor and wherein said capacitor and said first inductance form a first series resonant circuit having a resonant frequency substantially identical with said output frequency, said second silicon controlled rectifier, said second inductance, and said capacitance being interconnected to form a second series circuit connected to said one end of said resonant load to to transfer energy to said resonant load during a second period of operation wherein said capacitor is discharged thereby, and said second inductance and said capacitance comprising a second series resonant circuit having a resonant frequency substantially equal to said output frequency of said resonant load; and means operably connected to each of said first and said second silicon controlled rectifiers for rendering them selectively conducting to resonantly charge and discharge each of said capacitors sequentially into said resonant load to sustain oscillations therein to provide an output signal of relatively high power.

References Cited by the Examiner

UNITED STATES PATENTS 3,026,486 3/1962 Pintell ---------- 331—117 X

JOHN F. COUCH, *Primary Examiner.*

W. M. SHOOP, *Assistant Examiner.*